N. D. RUTHERFORD.
MILKING MACHINE.
APPLICATION FILED APR. 26, 1920.
1,416,880.
Patented May 23, 1922.
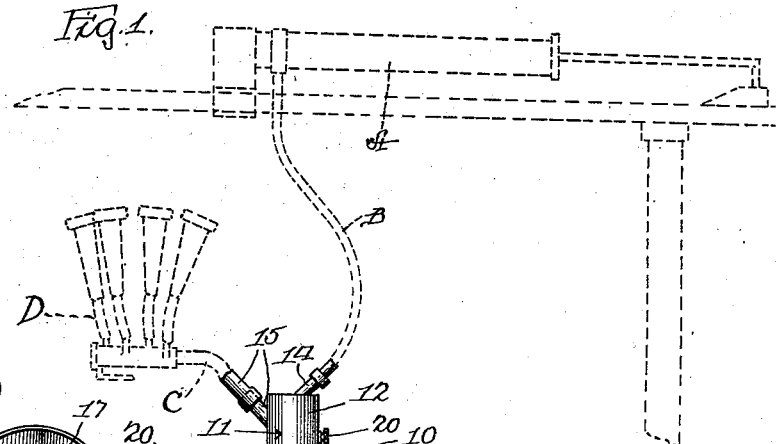
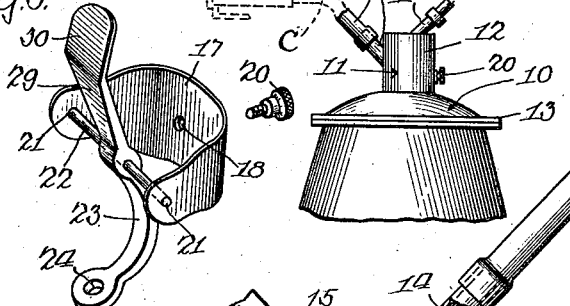
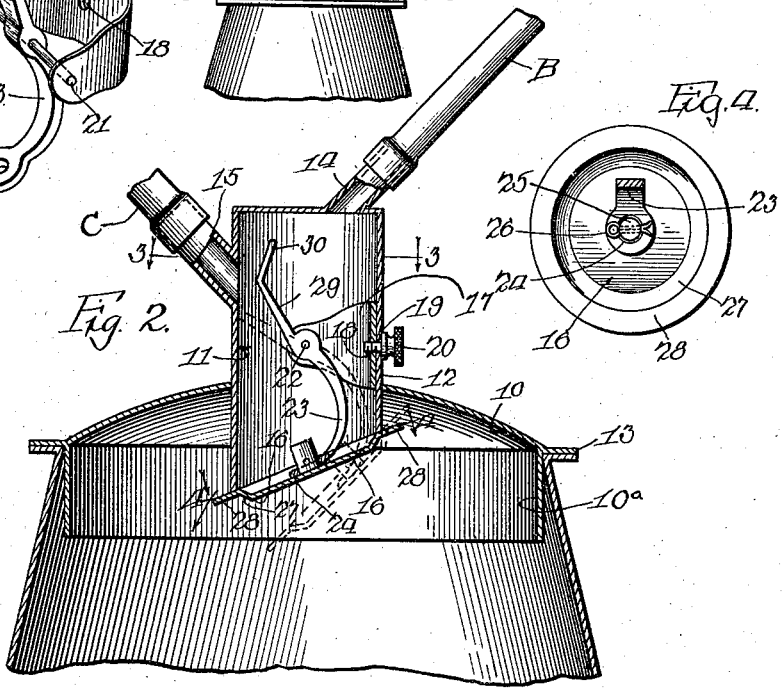
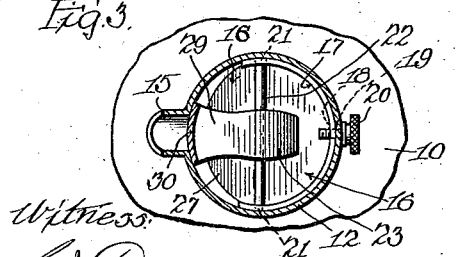
Inventor
Nealon D. Rutherford.
By Arthur F. Sprinkle
Atty.
Witness:

UNITED STATES PATENT OFFICE.

NEALON D. RUTHERFORD, OF LANSING, MICHIGAN, ASSIGNOR TO UNITED ENGINE COMPANY, A CORPORATION OF MICHIGAN.

MILKING MACHINE.

1,416,880.

Specification of Letters Patent.   Patented May 23, 1922.

Application filed April 26, 1920.   Serial No. 376,529.

*To all whom it may concern:*

Be it known that I, NEALON D. RUTHERFORD, a citizen of the United States, residing at Lansing, in the county of Ingham and State of Michigan, have invented certain new and useful Improvements in Milking Machines, of which the following is a specification.

This invention relates to milking machines and particularly to that class of milking machines wherein a vacuum chamber is used disposed between the teat cups and the vacuum pump, this chamber being disposed over a milk receiving receptacle.

One of the objects of this invention is to provide a valve for disestablishing or establishing communication between the vacuum chamber and the receptacle, and a valve for establishing or disestablishing communication between the teat cups and the vacuum chamber, these valves being so arranged that when one is opened, the other is closed, the first named valve swinging to an open position under the action of gravity upon the inward stroke of the vacuum pump and when the vacuum within the vacuum chamber is relieved.

A further object is to provide a vacuum chamber of a very simple construction provided with means whereby it may be readily attached to a milk receptacle, and provide very simple means for supporting the double valve above referred to within the vacuum chamber, this means being so constructed as to permit the ready detachment of the valve and valve support from the vacuum chamber and permit the ready replacement of the valve support and the valves and the correct positioning of the parts within the vacuum chamber.

A further object of the invention is to provide a valve closing and opening the milk outlet from the chamber, so mounted that it will seat closely against the wall of the outlet.

A further object of the invention is to provide means for preventing the back pressure of the vacuum pump being carried to the teat cups and forcing the cups from the teats.

Another object of the invention is to so construct and arrange the milk inlet and the valve mechanism controlling same that the milk upon entering the vacuum chamber will be deflected to the bottom of the chamber without undue agitation thereof.

Other objects will appear in the course of the following description.

My invention is illustrated in the accompanying drawings, wherein:—

Fig. 1 is an elevation of a receptacle provided with my improved valve, showing its connections to the pump and teat cups, and these last named parts also in dotted lines.

Fig. 2 is a vertical sectional view through a portion of such a receptacle and through the vacuum chamber.

Fig. 3 is a section on the line 3—3 of Fig. 2, and Fig. 4 is a section on the line 4—4 of Fig. 2.

Fig. 5 is a perspective view of the valve supporting yoke with the valve stem supported therein.

Referring to these drawings, 10, designates the cap of a receptacle upon which the vacuum chamber 11 is mounted. The cap 10 is formed with a downwardly extending flange 10$^a$, which fits within the milk receptacle and with an outwardly extending flange 13, which bears upon the top of the receptacle. With my improved vacuum chamber it is not necessary that the receptacle shall be air tight, or that the cap shall have an air-tight fit within the receptacle. The vacuum chamber designated generally by the reference character 11 consists of an annular wall 12, this wall extending down into the cap 10 and the lower edge of this wall being inclined downward and laterally together with end closures therefor. The upper end of the vacuum chamber has a permanent closure but the wall thereof is provided with a nipple 14 whereby the vacuum chamber may be connected to the usual vacuum pump A. This nipple is preferably, though not necessarily, disposed at an angle which will prevent any bend in the pipe or tube B joining the pump with the vacuum chamber. The nipple 14 is disposed, not at the axial center of the chamber 11, but toward one side wall thereof, and extending from the opposite portion of the annular side wall 12 is a nipple 15 from which a flexible tube or pipe C passes to the teat cups D, as is usual. It will be noted that the milk inlet nipple 15 is disposed on that side of the chamber which extends down deepest into the cap 10, and also enters through the chamber wall 12 near the top thereof and at an angle of approximately 45 degrees to the vertical axis of the chamber, as well as at an angle of approximately 45 degrees to the vertical side wall of the chamber, in order that the incoming stream of milk from the teat cups may enter the chamber at a downward inclination. This positioning of the milk inlet 15 so that the direction of discharge of the stream of inflowing milk into the chamber, downwardly in the direction of the discharge valve at the lower end of the chamber, is an important feature of my invention, as will be presently described.

I provide a valve or closure plate at the lower end of the chamber, the same being designated by the reference character 16 and which has a diameter greater than the diameter of the lower end of the chamber. This valve is mounted to open downwardly and upon upward movement contacts against an angular seat formed peripherally around the lower edge of the wall of the vacuum chamber resulting in an air tight closure when the valve 16 is seated.

The mounting of this valve 16 and the synchronously operating valve which closes the milk inlet 15 is one of the important features of my invention, which will now be described.

Disposed within the vacuum chamber is a curved supporting yoke 17, preferably somewhat resilient and expanding outward. This yoke, under normal conditions, has a diameter slightly greater than the diameter of the chamber 11, and in order to place the yoke within the chamber, the yoke is contracted and forced into the chamber to its proper position, the resiliency of the yoke urging its ends outward and causing the yoke to fit tightly within the vacuum chamber. The yoke is formed with a screw threaded perforation 18, and the wall 12 of the vacuum chamber is provided with the perforation 19. A headed screw 20 passes through the perforation 19 and into engagement with the perforation 18 and thus the yoke is held in its proper position. The extremities of the yoke are formed with apertures 21 for the reception of the ends of the transverse pivot pin 22. This pivot pin 22 rotates within the bearings formed by the perforations 21 and when the yoke is removed from the vacuum chamber, the arms of the yoke spring away from each other, thus detaching the pivot pin 22 from engagement with the yoke. When the yoke is disposed within the vacuum chamber, however, the contraction of the yoke causes the arms to properly engage the pivot pin 22 and the ends of the pivot pin, bearing as they do against the wall 12, prevent any lateral shifting of the pivot pin.

Mounted upon the pivot pin is a downwardly extending curved or inclined arm 23, which is preferably made of a strip of metal, soldered or otherwise attached to the pivot pin 22 at its middle. This arm extends downward from pivot pin 22 to the end of the vacuum chamber 11 to support valve 16 and at its lower extremity extends approximately horizontal and has formed therein a central aperture 24, this aperture being preferably circular, though not necessarily so. The valve 16 is formed with an upwardly extending stud 25 at its center, which is adapted to extend through the aperture 24 and be held in place in the aperture by a transversely extending cotter pin 26. It will thus be seen that if the aperture 24 be circular and the stud 25 be circular, the valve 16 can rotate around its axial center. This valve 16 is preferably dish-shaped, that is, it has an upwardly extending margin 27 with an outwardly extending flange 28, this flange bearing against the lower edge of the wall 12 to form a closure when the valve is therewith seated. The perforation 24 is sufficiently large to permit of a slight play between the stud 25 and the perforation, so that the valve 16 may rock or oscillate to a slight degree to permit it to readily adjust or seat itself upon the lower end of the wall 12 of the chamber.

Preferably the arm 23 is continued above the pivot pin 22, as at 29, and is then extended directly upward as at 30, to form a valve controlling the milk inlet opening defined by the nipple 15. When the valve 16 is open, the valve 30 will close the milk inlet opening and when the valve 16 is closed or drawn upward tight against the lower edge of the wall 12, the valve 30 will be spaced from the milk inlet and milk can enter the vacuum chamber. It will be noted that the pivot pin 22 is disposed diametrically between the vertical walls of the vacuum chamber and attached near the middle of arm 23 and hence the valve 16 is almost evenly balanced, but not quite evenly balanced, so that the weight of the valve 16 will normally act to shift the arm 23 toward the right (Figs. 2, 3 and 5) and the valve 30 against the opening of the nipple 15. Upon an exhaust stroke of the pump connected to the nipple 14, the air will be more or less exhausted from the chamber 11 and this will cause the valve 16 to swing to its closed position and when this occurs, the valve 30 mounted on arm 23 will move to a position spaced from the milk inlet opening 15 and the milk will be drawn from the teat cups into the vacuum chamber 11. Upon a reverse movement of the vacuum pump piston, however, the vacuum within the chamber 11 is relieved and as a consequence, the valve 16 opens by its own gravity, and the weight of the milk, which has been drawn into the chamber 11, and the milk discharged into the receptacle below. At the same time, the valve 30 closes the milk inlet opening, thus preventing any back pressure returning to the teat cups and forcing the cups from the teats, and further preventing the warm air from the milk returning to the teats. Again, my construction provides a single unitary device which may be connected to a bucket top and which may be used with any ordinary receptacle.

It will be noted that the device may be readily cleansed by removing the screw 20, whereupon the valve 16 may be drawn outward drawing with it the yoke or supporting member 17, and as soon as the yoke or supporting member 17 has passed below the lower edge of the wall 12, the resilience of the yoke will cause it to expand, thus releasing the pin 22. The valve may be readily removed from the arm 23 by removing the cotter pin 26 and thus all parts of the valve may be thoroughly sterilized and put in condition for use.

It will be noted that when the valve 16 opens, the lower edge of the valve is disposed further from the adjacent edge of the wall 12 than is the upper margin of the valve and, furthermore, that as the valve is inclined, milk will readily discharge from the lower end of the chamber 11.

By providing a milk inlet which does not tangentially enter through the side walls of the chamber but discharges directly toward the vertical axial center thereof and by the peculiar arrangement of the milk inlet nipple by which the discharge therefrom is downwardly toward the pivot pin 22 of the valve arm, I prevent any swirling or rotary motion to the incoming stream of milk from the teat cup; and furthermore, because of the construction described, of the valve arm 23 as continued at 29, above its pivotal mounting, together with the valve 30 thereon, I provide a movable pivoted wall which when the valve 30 is open presents a substantial baffle wall almost parallel with the incoming stream of fresh milk passing through nipple 15 into the chamber and at the same time preventing any tendency of the said stream of incoming milk to rise toward the top of the chamber and tend to clog or be drawn out through the nipple 14 leading to the air pump upon the suction stroke of the pump. The milk entering the chamber in a downwardly inclined direction on the angle of 45 degrees to the vertical walls thereof will be immediately deflected by baffle 29 in a gentle manner to the lower part of the chamber to be discharged into the receptacle below upon the opening of the valve 16 at the cessation of the suction stroke of the pump.

It will be seen that upon the completion of the suction stroke of the pump and upon the beginning of a pressure stroke the valve 16 will be free to open by reason of any pressure in the chamber and more particularly, because of the weight of accumulated milk therein with the result that the shifting of the arm 23 will swing the valve 30 to close the opening leading to the teat cups through nipple 15 and hence cut off any back pressure through the tube C, leading to teat cups D which would result in detachment of said teat cups from their normal working position, unless held on the teats of the cow by a surcingle or other extraneous means.

In order that the invention might be understood, the details of the preferred embodiment thereof have been illustrated and particularly described, but it is not desired to be limited to the details for it will be apparent that persons skilled in the art may resort to various modifications without departing from the purpose and spirit of my invention.

I claim:

1. A vacuum chamber for milking apparatus having a valve controlled milk inlet, a valve controlled outlet, there being also a passageway leading through one wall of said vacuum chamber to an air exhausting device, and means for automatically closing one of said valves when the other valve is opened, comprising an arm extending between the said valves and being pivotally mounted intermediate thereof, and arranged in conjunction with one of said valves to form a baffle wall between the valve controlled milk inlet and the passageway adapted to lead from the chamber leading to the air exhausting device.

2. A vacuum chamber for milking apparatus having a milk outlet and a milk inlet, valves controlling the outlet and inlet, and means connecting said valves together for simultaneous movement in reverse directions with respect to each of the said valve seats controlling the said milk outlet and the said milk inlet, said means comprising a member pivotally mounted intermediate its extremities and between the said valves and providing in conjunction with the said inlet valve a baffle surface or wall for preventing contact of the incoming stream of milk with the walls of the chamber and conducting same to the outlet valve.

3. A vacuum chamber for milking machies having a milk inlet and a milk outlet, and valves controlling the outlet and inlet connected to each other for alternately opening and closing said valve.

4. A vacuum chamber for milking apparatus having a milk outlet and a milk inlet, a gravity opened valve controlling the outlet, and a valve controlling the inlet operatively connected to the first named valve to operate reversely thereto.

5. A vacuum chamber for milking apparatus having a milk outlet and milk inlet, valves controlling the outlet and inlet, the outlet valve being pivotally supported and swinging to an open position by gravity.

6. A vacuum chamber for milking apparatus having a milk outlet and a milk inlet, valves controlling the outlet and inlet, the outlet valve being pivotally supported and swinging to an open position by gravity, the inlet valve being connected to the outlet valve to operate reversely thereto.

7. A vacuum chamber for milking apparatus having a milk discharge valve yieldably held in open position by gravity, but shiftable to a closed position upon the exhaustion of air from said chamber, and a valve controlling the inlet of milk into said chamber and connected to the discharge valve to open when the discharge valve closes and to close when the discharge valve opens.

8. A vacuum chamber for milking apparatus having a milk inlet and a milk outlet, and a rocking arm for closing the milk inlet when the milk outlet is opened and opening the milk inlet when the milk outlet is closed.

9. A vacuum chamber for milking machines having an open discharge end and having a milk inlet in one wall, a valve controlling the discharge end of the chamber, a valve controlling the milk inlet, and a member connecting said valves and pivoted within the chamber, the discharge valve by gravity causing said member to swing to a position to open the discharge valve and close the milk inlet, said discharge valve swinging to a closed position and opening the milk inlet valve upon an exhaustion of air from the chamber.

10. A vacuum chamber for milking machines having a discharge opening, a valve controlling the discharge opening, and a support from which the valve is swung, said support being disposed within the chamber and having resilient engagement with the wall thereof.

11. A vacuum chamber for milking machines, open at its lower end, a valve controlling discharge through the lower end of the vacuum chamber, a yoke supporting the valve having arms resiliently urged outward from each other, said yoke being disposed within the vacuum chamber and the arms resiliently engaging the wall thereof, and means for detachably engaging the yoke with the chamber wall.

12. A vacuum chamber for milking machines annular in cross section, the lower end of the chamber being open, a valve for controlling said open end, an arcuate supporting member disposed within the chamber and bearing against the wall thereof, the arms of the supporting member being resiliently urged outward against said wall, a screw passing through the wall of the chamber and detachably engaging said support, and an arm pivoted to the support and operatively connected to the valve.

13. A vacuum chamber for milking machines, cylindrical in cross section and open at its lower end, a valve coacting with the lower end of the chamber, a support for said valve comprising an arcuate resilient yoke held under compression by the wall of the chamber, means engaging the yoke with the chamber, the ends of the yoke being perforated, a pivot pin passing through the perforated ends of the yoke and held in place by the wall of the chamber, and an arm operatively connecting the pivot pin to the valve.

14. A vacuum chamber for milking machines open at one end, a valve therefor, an arm supporting the valve and a pivotal support for the arm including a yoke sprung into place within the chamber and having perforations at its ends, and a pivot pin having a length equal to the diameter of the chamber and having its ends inserted in the perforations of said yoke.

15. A cover for the milk receptacles of milking machines, having a vacuum chamber disposed vertically through it, the lower end of the vacuum chamber being open, the upper end of the vacuum chamber having an exhaust nipple, and a milk inlet, a normally open valve controlling discharge through the lower end of the vacuum chamber, a valve controlling the milk inlet, and single means for swingingly supporting said valves and causing them to operate reversely to each other whereby when the discharge valve is closed the milk inlet valve shall be opened and vice versa.

16. A vacuum chamber for milking machines having an open lower end, a valve controlling the lower end, and an arm extending upward into the vacuum chamber and pivotally supported therein, the valve having rotatable engagement with said arm for movement in a plane of the valve.

17. A vacuum chamber for milking machines, the lower end of the chamber being open to provide for the discharge of milk and a laterally swingingly mounted valve controlling discharge through the open lower end, said valve being in the form of a dish-shaped disk providing a marginal flange engaging with the lower edge of the chamber.

18. A vacuum chamber for milking machines, said chamber being vertically disposed and having an exhaust outlet at its upper end, a milk inlet adjacent its upper end and in its side wall, the lower end of the chamber being open and having its lower edge inclined downward and toward the wall having the milk inlet, a valve formed to close the lower end of the chamber, a support for said valve mounted within the chamber, and an arm operatively connected to the valve extending upward into the chamber and pivotally connected to the support and then extending upward and toward the inlet opening and formed to provide a milk inlet controlling valve gravity acting to hold the discharge valve open and the milk inlet valve closed, said discharge valve closing upon the exhaustion of air from the chamber and thereby opening the milk inlet valve.

In testimony whereof I have signed my name to this specification on this 1st day of April A. D. 1920.

N. D. RUTHERFORD.